(12) United States Patent
Constantino

(10) Patent No.: US 7,674,977 B1
(45) Date of Patent: Mar. 9, 2010

(54) WALL OUTLET PLATE ASSEMBLY

(75) Inventor: Joseph Constantino, Strongsville, OH (US)

(73) Assignee: Airtite Systems LLC, Strongsville, OH (US)

(*) Notice: Subject to any disclaimer, the term of this patent is extended or adjusted under 35 U.S.C. 154(b) by 74 days.

(21) Appl. No.: 12/001,689

(22) Filed: Dec. 12, 2007

Related U.S. Application Data

(60) Provisional application No. 60/874,448, filed on Dec. 12, 2006.

(51) Int. Cl.
*H02G 3/14* (2006.01)
*H05K 5/03* (2006.01)

(52) U.S. Cl. ............... 174/67; 174/66; 174/53; 220/241; 220/242; 220/3.2

(58) Field of Classification Search ......... 174/66, 174/67, 480, 481, 53, 57, 58, 482, 483, 484; 220/3.2, 3.3, 37, 3.8, 241, 242; 439/137, 439/135, 136, 340, 732, 145, 195, 148; D13/156, D13/177; D8/353
See application file for complete search history.

(56) References Cited

U.S. PATENT DOCUMENTS

| | | | |
|---|---|---|---|
| 1,713,101 A | | 5/1929 | Starrett |
| 2,870,933 A | * | 1/1959 | Winter .................. 220/242 |
| 3,252,611 A | * | 5/1966 | Weitzman et al. ......... 174/67 |
| 3,392,228 A | | 7/1968 | Zerwes |
| 4,058,358 A | * | 11/1977 | Carlisle ................ 220/242 |
| 4,163,137 A | | 7/1979 | Close, Jr. |
| 4,197,959 A | * | 4/1980 | Kramer ................. 174/67 |
| 4,250,349 A | | 2/1981 | Bennett |
| 4,293,173 A | | 10/1981 | Tricca |
| 4,343,411 A | | 8/1982 | Chesnut et al. |
| 4,447,484 A | | 5/1984 | Slosnerg et al. |
| 4,456,145 A | * | 6/1984 | Frank .................. 220/242 |
| 4,605,270 A | | 8/1986 | Aslizadeh |
| 4,794,207 A | | 12/1988 | Norberg et al. |
| 5,096,430 A | * | 3/1992 | D'Amico ............... 174/67 |
| 5,571,023 A | * | 11/1996 | Anthony ............... 220/242 |
| 5,800,188 A | * | 9/1998 | Barber et al. ........... 220/242 |
| 6,222,125 B1 | | 4/2001 | Shoemaker |
| 6,252,167 B1 | | 6/2001 | Rose |
| 6,265,662 B1 | * | 7/2001 | Riedy et al. ............ 174/67 |
| 6,521,834 B1 | | 2/2003 | Dykhoff et al. |
| 2003/0019652 A1 | | 1/2003 | Shoemaker |

OTHER PUBLICATIONS

Royal Baby Safety Online Catalog—www.babysafe.com.
Lectralock website catalog—www.lectralock.com.
Maplin Electronics website catalog—www.maplin.coo.uk.
Energy Federation Incorporation website catalog—www.efi.org.
Ebay product—www.cgi.ebay.com.

* cited by examiner

*Primary Examiner*—Angel R Estrada
(74) *Attorney, Agent, or Firm*—D. Peter Hochberg; Sean F. Mellino; Daniel J. Smola

(57) ABSTRACT

An insulated wall outlet plate assembly. The assembly provides the dual functions of both preventing drafts through the outlet and for preventing against unwanted or accidental access to the outlet. The wall outlet plate assembly includes a wall plate for covering an electrical outlet, a flap assembly secured to the plate having moveable flaps which may be secured in place to close the openings in the outlet plate and a layer of insulation material secured to the backside of the outlet plate for providing insulation against drafts through the outlet. The flaps include an underlying ridge which secures the flaps in place relative to the openings of the outlet plate.

29 Claims, 7 Drawing Sheets

US 7,674,977 B1

WALL OUTLET PLATE ASSEMBLY

CROSS-REFERENCE TO RELATED APPLICATION

This application claims priority of U.S. Provisional Application No. 60/874,448, filed Dec. 12, 2006, under Title 35, United States Code, Section 119(e).

BACKGROUND OF THE INVENTION

1. Field of the Invention

The present invention relates generally to a wall outlet plate assembly for use with and for covering an electrical outlet in a home or building. More particularly, the present invention relates to an insulated wall outlet plate assembly which protects against and prevents drafts of air from passing through the wall outlet, as well as unwanted or accidental access to the wall outlet.

2. Description of the Prior Art

Wall electrical plates are commonly found throughout homes and buildings. It is well known that electrical outlets can pose as a hazard and danger to small children and/or pets, in particular by children placing fingers or objects into an electrical outlet and risking electrocution. Various devices are available as safety enclosures for preventing such unwanted access to an electrical outlet by children. For example, plastic plugs (also known as "baby plugs") can be inserted into an unused electrical outlet to prevent unwanted access by children. However, such devices are not without inherent disadvantages, as discussed below.

One shortcoming in the prior art is that not all outlets are uniform. Many outlets, especially in older homes and buildings, are provided as two-prong outlets while many newer electrical outlets are provided as three-prong outlets (or grounded outlets). Therefore, a two-prong baby plug would not provide sufficient protection for use with a three-prong outlet, while a three-prong baby plug would not be able to be used at all with a two-prong outlet. Therefore, one would be required to purchase both two-prong and three-prong baby plugs for use with the specific type of outlet. In addition, alternative baby plugs must be employed for use with wall outlets having a single plug, such as an outlet for a cable television line.

Another disadvantage with conventional baby plugs is that if they are removed from an outlet by a child they can be placed in the mouth and accidentally swallowed, thereby providing an additional choking hazard to children and/or pets. Still further, conventional baby plugs can be removed and lost, thereby requiring the repeated purchase of replacement plugs.

Wall outlet plates also provide a lesser known issue for homes and buildings by way of allowing cold air to enter the room via drafts through the outlets. Alternatively, warm air could also enter the room via the outlet to undesirably heat air conditioned cool air which is inside the room. The consequence of drafts through an electrical outlet is that the cost of heating (or cooling) a room increases in order to make up for cold (or warm) air entering the room through the outlet.

Therefore, in light of these factors, there is a need for an improved electrical wall plate assembly serving the dual purpose of eliminating drafts through the electrical outlet and as a safety measure for providing protection against unwanted access to the electrical outlet.

SUMMARY OF THE INVENTION

According to one broad aspect of the present invention, there is provided an insulated wall outlet plate assembly for use in homes and buildings.

It is an object of the present invention to provide an insulated wall outlet plate assembly for reducing the amount of drafts in and through a wall outlet.

Another object of the present invention is to provide an insulated wall outlet plate assembly which prevents unwanted access to an electrical outlet.

Yet another object of the present invention is to provide an insulated wall outlet plate assembly which facilitates a reduction in heating and/or cooling costs for homes and buildings.

Still yet another object of the present invention is to provide an insulated wall outlet plate assembly which can easily be employed in connection with an electrical outlet or adapted for use with other types of outlets.

It is an additional object of the present invention to provide an insulated wall outlet plate assembly which can easily replace an existing wall outlet plate.

It is yet another object of the present invention to provide an insulated wall outlet plate assembly which can be manufactured in a cost-efficient manner.

Still yet another object of the present invention is to provide an insulated wall outlet plate assembly which can be adapted for use with other types of wall plates, such as wall plates for cable television lines, high speed Internet connection lines and the like.

Other objects will become apparent from the description to follow and from the appended claims.

DETAILED DESCRIPTION OF THE PREFERRED EMBODIMENTS

Figure 1:
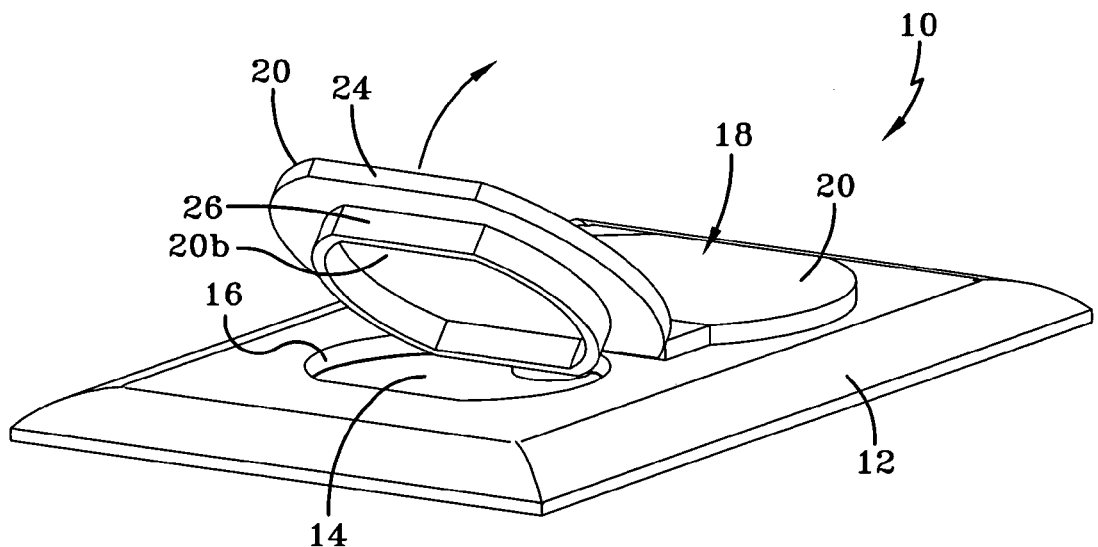
FIG. 1 is a perspective view of one embodiment of the wall outlet plate assembly according to the present invention.

The present invention is now described with reference to the drawings, wherein like reference numerals are used to refer to like elements throughout. In the following description, for purposes of explanation, numerous specific details are set forth in order to provide a thorough understanding of the present invention. It will be evident, however, to one skilled in the art that the present invention may be practiced without these specific details.

Turning now to FIGS. 1-5, the insulated wall outlet plate assembly of the present invention is shown and referred to generally at numeral 10. Wall outlet plate assembly 10 provides an accessible wall outlet plate for an electrical wall outlet (not shown) for providing an insulated covering over the wall outlet when the wall outlet is not in use while also providing a preventative measure against children (or pets) accessing the electrical components of the wall outlet. Outlet plate assembly 10 provides secure protection against unwanted access to the electrical outlet, while allowing relatively easy disengagement when access to the electrical outlet is desired by an authorized person.

As shown in FIGS. 1-5, outlet plate assembly 10 comprises a wall outlet plate 12 having a rectangular-shaped body having two accessible openings 14 which correspond to the underlying electrical outlet (not shown) over which outlet plate assembly 10 extends and covers. It should be appreciated that the outlet plate 12 of outlet plate assembly 10 of the present invention may include any number of openings 14 and may include a body having any conventional shape; however, for ease of discussion, the present invention will be shown and described in this instance as having a rectangular-shaped body comprising two openings 14. It should be appreciated that plates 12 may comprise any material conventional in the art, such as hard plastic, flexible plastic, rubber, wood, metal, etc.

Each opening 14 is defined by an outer rim or surface 16. Openings 14 of the present invention have dimensions which are larger than typical openings of conventional wall plates. For example, standard openings on standard wall outlets generally have a height of about 1⅛ inch and width of about 1¹¹⁄₃₂ inches. Openings 14 of the present invention have dimensions of a height of at least about 1³⁄₁₆ inches and a width of at least about 1¹³⁄₃₂ inches. Of course, it should be appreciated that the openings 14 of the present invention needs not be limited to these dimensions.

Figure 10:
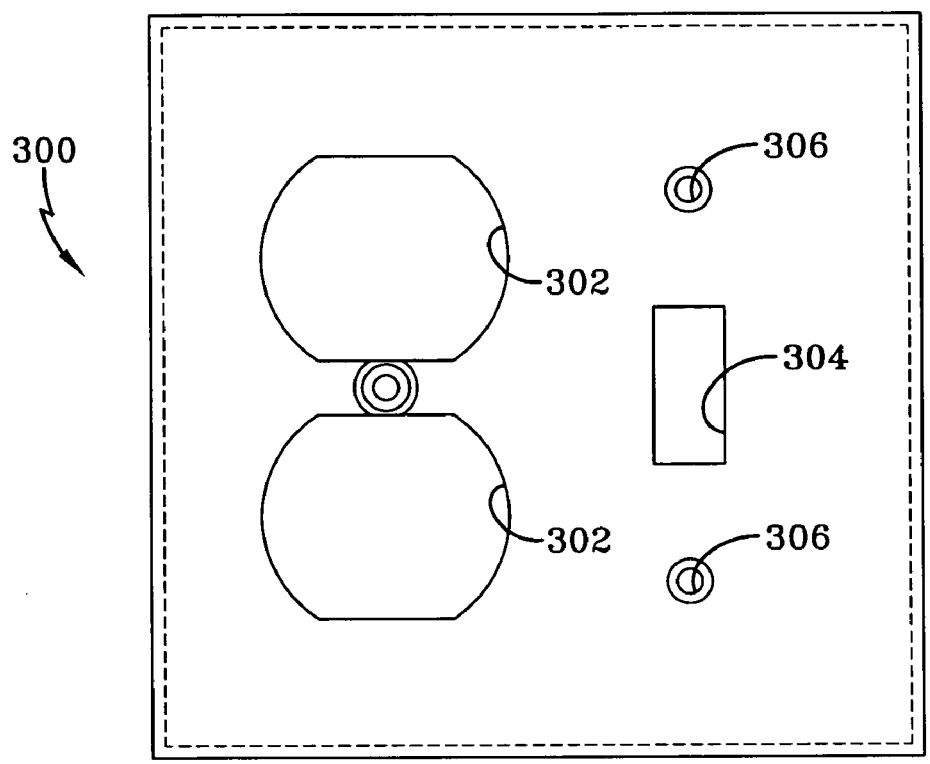
FIG. 10 is a front view of an alternative wall plate for use with the wall outlet plate assembly according to the present invention.
Figure 11:
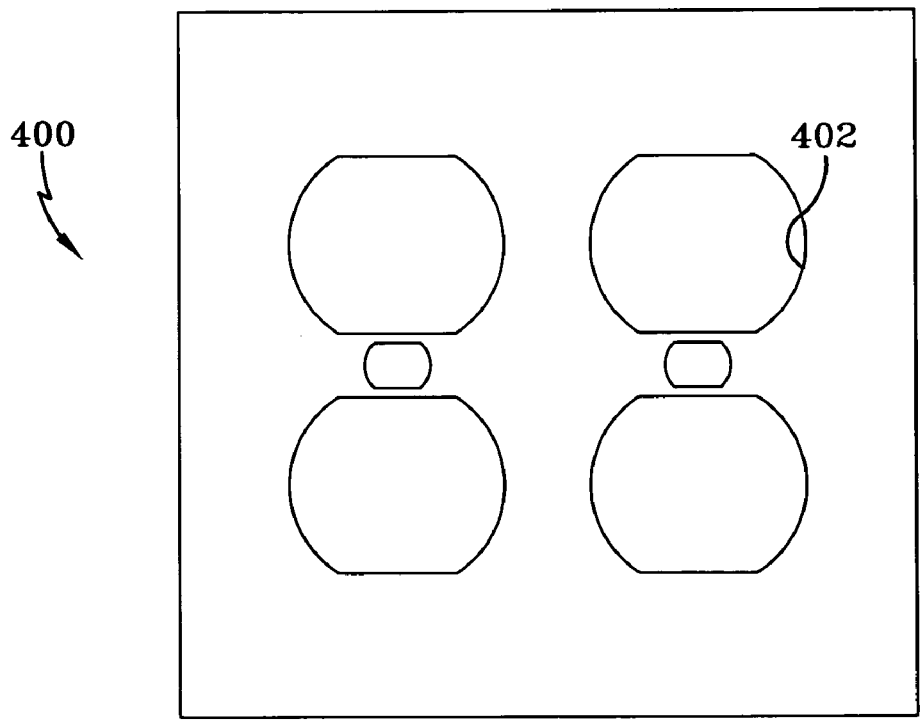
FIG. 11 is a front view of another alternative wall plate for use with the wall outlet plate assembly according to the present invention.
Figure 12:
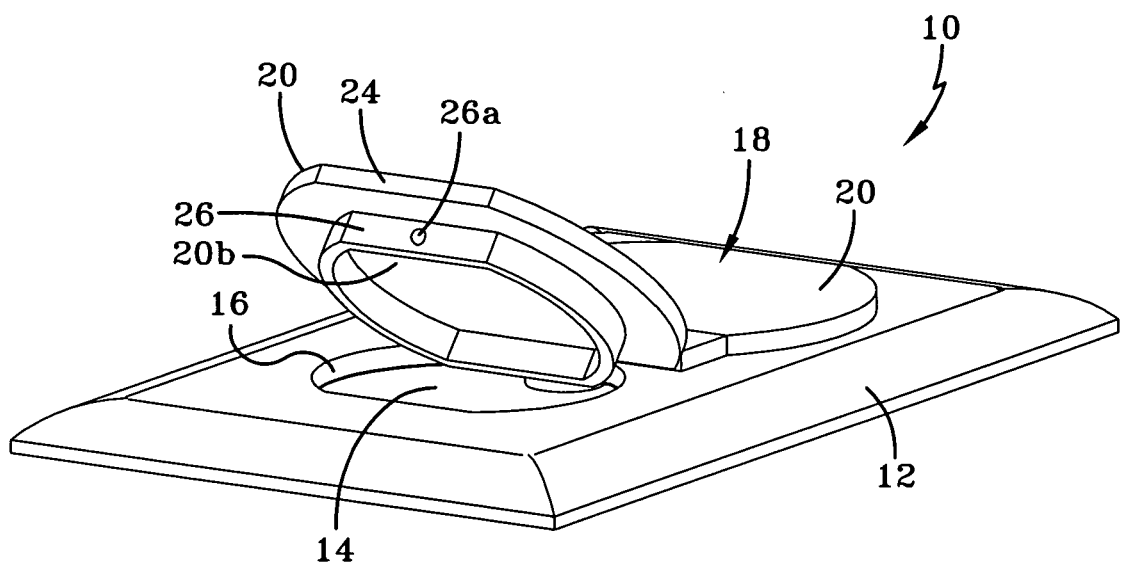
FIG. 12 is a perspective view of additional embodiment of the wall outlet plate assembly according to the present invention.

As shown in FIGS. 1-5, outlet plate assembly 10 also includes a closure assembly 18 having a central spine 22 (FIG. 2) and two opposing flaps, covers or seal caps 20 having an outer edge 24 with a defined configuration. Flaps, covers or seal caps 20 extend outwardly from spine 22 and are movable relative to spine 22 via a flexible joint 38 interconnecting each flap 20 to spine 22. Each flap 20 comprises a top surface 20a (FIG. 2), a bottom surface 20b (FIG. 1) and an underlying ridge 26 (FIGS. 1 and 4) integrally formed with bottom surface 20b of each flap 20. Ridge 26 is described herein and shown in the figures as having a truncated ovoid shape; however, it should be appreciated that ridge 26 comprises the same general shape and dimension as the corresponding opening 14. In this regard, the shape of flap 20 itself may be different from ridge 26 so long as ridge 26 has a corresponding shape and dimension to the respective opening 14. For example, flap 20 may be round, rectangular, triangular, star-shaped, etc., or any combination thereof for pairs of flaps, while ridge 26 has a shape and dimension corresponding to the shape and dimension of the respective opening 14. It should be further appreciated that closure assembly 18 may comprise any material conventional in the art, such as thermoplastic, metal, wood, rubber, a luminescent material, etc. It should still further be appreciated that wall outlet plate assembly 10 may be employed with both standard electrical outlets, as well as with other types of outlets, such as an outlet for a cable television line, an outlet for a high-speed Internet line, light switches, light switch plates having dimmer functions, such as the DECORA® brand switch, or even in connection with wall plates for any one of a number of international-type electrical outlets. For example, wall outlet plate assembly 10 may be employed with an outlet plate 300 having two electrical outlet openings 302, an accommodation for a light switch 304 and an accommodation for a cable television plug 306 (FIG. 10) or with an outlet plate 400 having four electrical outlet openings 402 (FIG. 11), or any other alternative combination of such features. Assembly 10 may further include at least one supplemental structure, for example, at least one nodule 26a (FIG. 12) on the face or outer periphery of ridge 26 for facilitating the formation of a tight engagement between ridge 26 and outer rim 16 of opening 14. As shown in FIG. 12, a single nodule 26a is provided. However, it should be appreciated that any number of nodules 26a may be provided on the outer periphery of ridge 26. Nodule 26a is integrally formed with ridge 26 and extends outwardly from the outer periphery of ridge 26 at a distance of $\frac{1}{32}^{nd}$ inch to $\frac{1}{16}^{th}$.

A receptacle could be made in rim 16 for receiving nodule 26a, and nodule(s) could likewise be added to rim 16 for engaging ridge 26. In the latter situation, receptacle for receiving nodules on rim 16 could be provided for receiving the latter nodules. Of course, nodules (and receptacles) could be placed alternatively on both the ridge and the rim.

Figure 2:
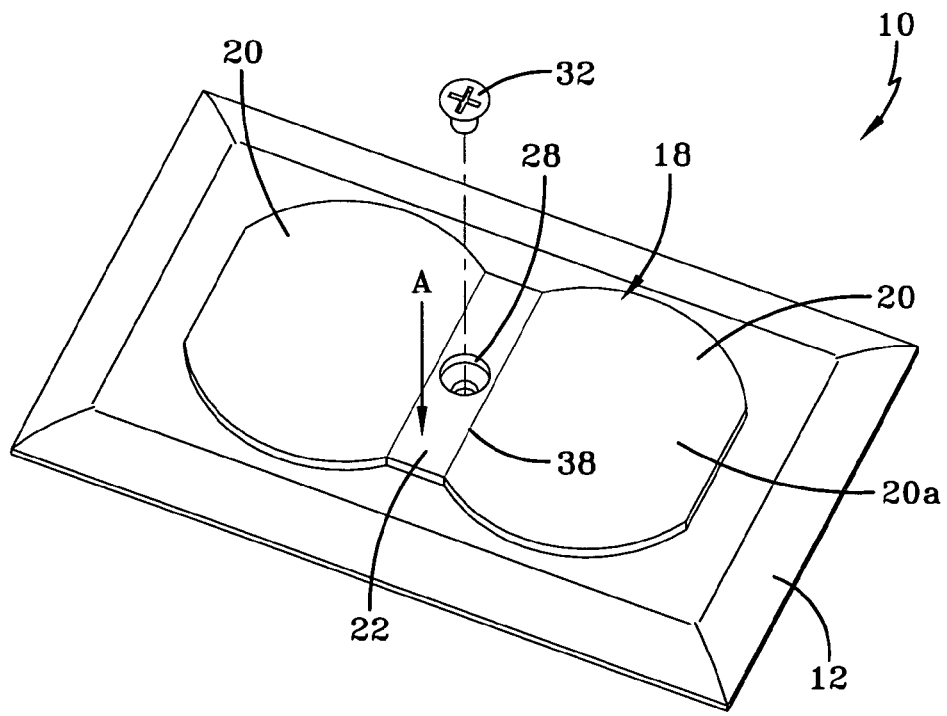
FIG. 2 is a top perspective view of the wall outlet plate assembly according to the present invention as shown in FIG. 1.
Figure 5:
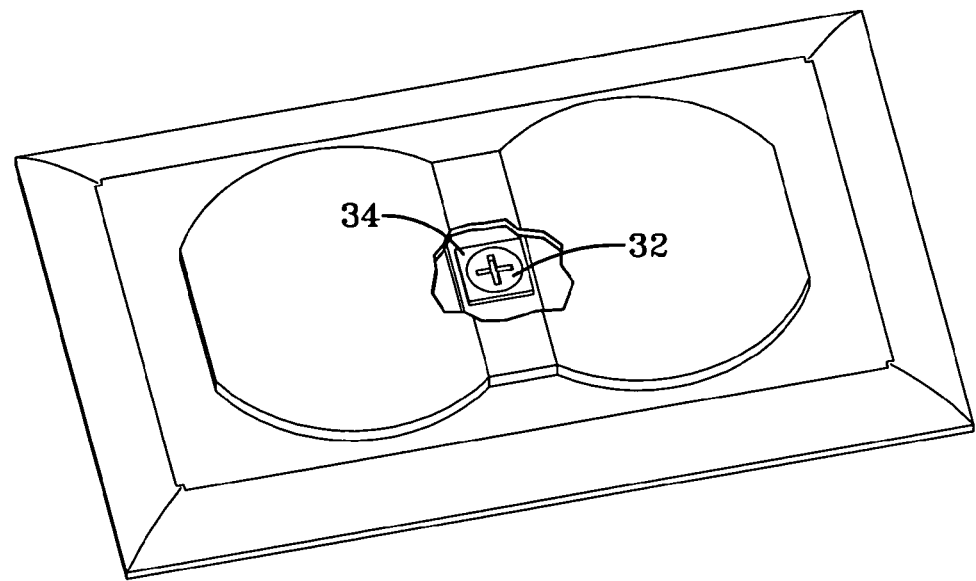
FIG. 5 is another top perspective view of the wall outlet plate assembly according to the present invention, showing a portion of the assembly broken away.

Closure assembly 18 includes a threaded hole or through hole 28 which corresponds to a threaded hole or through hole 30 (FIG. 3) of outlet plate 12. Holes 28, 30 are aligned for receiving a securing device 32, such as a threaded screw, for securing closure assembly 18 to outlet plate 12. It should be appreciated that outlet plate 12 and closure assembly 18 may also be formed as an integral unit by any conventional thermoplastic injection molding process known in the art. In one instance, threaded screw 32 may be threaded into and/or through holes 28, 30 such that the head of threaded screw 32 is substantially flush with outlet plate 12 (FIG. 2). In another instance, a washer (or nut) 34 (FIG. 5) may be secured between the head of threaded screw 32 and outlet plate 12 to provide a spacing between head of threaded screw 32 and outlet plate 12 (FIG. 5). Washer/nut 34 also acts as a pivot point or pivot area for facilitating the removal of flaps 20, as discussed in more detail below. Alternatively, washer/nut 34 may be an integral portion which is integral with outlet plate 12, through which washer/nut 34 may pass.

As shown in FIG. 1, flaps 20 extend outwardly from the respective spine 22 such that flaps 20 correspond to and are engageable with openings 14. In other words, while in a closed position, each ridge 26 of flaps 20 corresponds with and engages with each rim 16 of openings 14 in a snap-fit engagement so that flaps 20 securely cover the corresponding opening 14 and substantially restricts access through the corresponding opening 14 to the electrical outlet. Each ridge 26 comprises substantially the same general circumference and configuration as each corresponding rim 16 for ensuring a tight and secure engagement between ridge 26 and the respective corresponding rim 18 for securing each flap 20 in place relative to the corresponding opening 14. When engaged, it should be appreciated that the lower surface 20b of each flap 20 between ridge 26 and outer edge 24 is flush with the face of plate 12 to also provide maximum occlusion of drafts therethrough.

Figure 3:
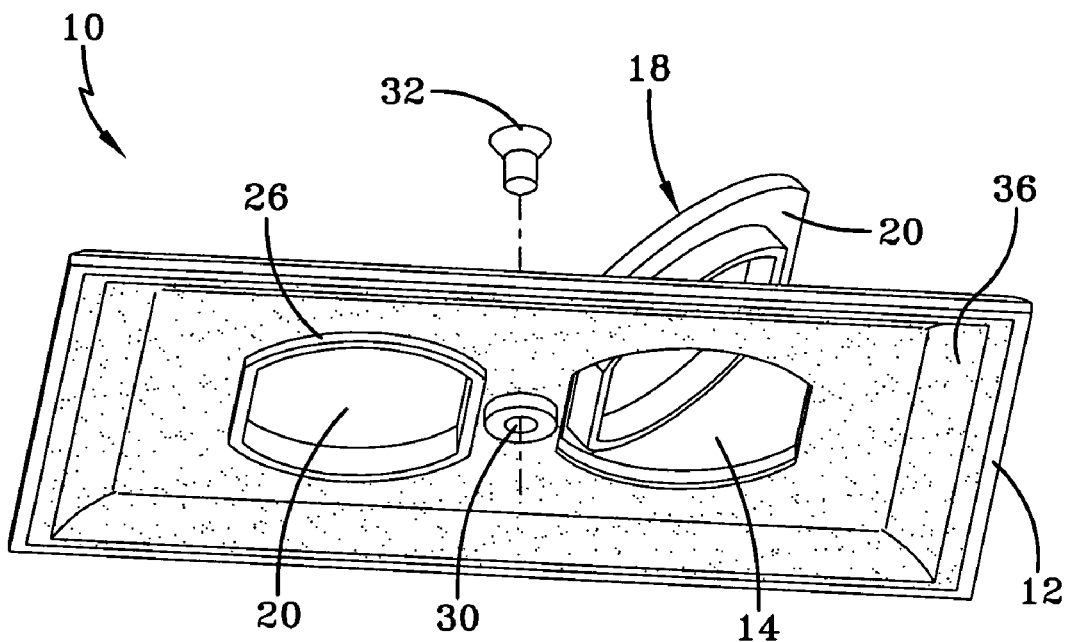
FIG. 3 is a rear perspective view of the wall outlet plate assembly according to the present invention as shown in FIG. 1.
Figure 4:
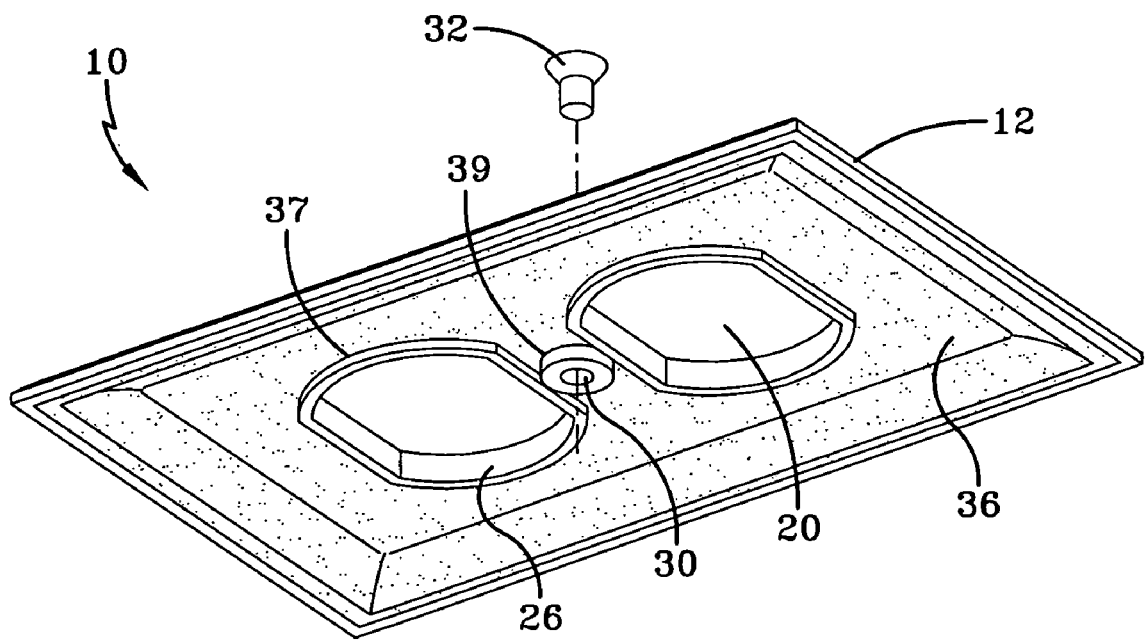
FIG. 4 is another rear perspective view of the wall outlet plate assembly according to the present invention as shown in FIG. 1.

Turning now to FIGS. 3 and 4, the assembly 10 of the present invention further includes a layer of insulation material 36. Insulation material 36 is applied on the backside of plate 12 and serves as an additional preventative measure against the transmission of unwanted drafts in and through the outlet assembly 10. It should be appreciated that insulation material 36 comprises the same general configuration with similar dimensions as outlet plate 12, is of a dimension and configuration such that the backside of outlet plate 12 is fully covered by insulation material 36 and includes openings which correspond in shape and number to openings 14 of plate 12. However, the openings of insulation material 36 should be slightly smaller than openings 14 so that insulation material 36 fits snugly and tightly around the underlying wall outlet, thereby eliminating, or at least significantly minimizing, any potential drafts through the electrical outlet. In other words, the openings of insulation material 36 are about the same size and dimensions as the size of the underlying electrical outlet plug in order to minimize or eliminate drafts through and around the outlet. Insulation material 36 may be further secured to outlet plate 12 by any conventional method known in the art, such as by gluing, by hooking under a curved edge of the outlet plate, etc. It should also be appreciated that insulation 36 may be comprised of any type of insulation material known in the art which is a non-flammable, fire retardant material, such as a thermal insulating material having a low thermal conductivity and good compressibility and resilience, such as, for example, but not limited to, fiberglass, mineral wool, plastic fiber (e.g., polyethylene terephthalate or PET), rubber, foams, such as polyurethane foams, urea-formaldehyde foam, nitrogen-based urea-formaldehyde foam, phenolic foam, cementitious foam, or a closed natural fibers, such as cotton, wool, hemp and straw. Of course, insulating material 36 also comprises a central opening 39 for accommodating the passage of threaded screw 32 therethrough and openings 37 for corresponding to the openings 14 of plate 12. Insulating material 36 may have a thickness of about between $\frac{1}{8}^{th}$ inch to $\frac{1}{4}$ inch.

With reference again to FIG. 2, the disengagement of flaps 18 from openings 14 will be discussed. As noted above, flaps 20 engage openings 14 such that the outer underside of flaps 20 are substantially flush with the outer facing of plate 12. In order to remove flaps 20 from the engagement with the corresponding opening 14, a user may manually provide pressure in an inward direction at a location near the center of flap 18 but near either joint 38 between flap 20 and spine 22 (directional arrow A—FIG. 2). The placement of pressure in direction A causes flap 20 to pivot outwardly (FIG. 1), thereby opening flap 20 and allowing access to the underlying electrical outlet. In other words, when force or pressure is applied (e.g., manually applied force or pressure) to the joint 38 towards the outlet plate 12, a reactive force is applied to the flaps 20 to disengage the ridges 26 from rim 16 and cause them to pivot away from the outlet plate 12 about joint 38. It should be appreciated, however, that the engagement between flaps 20 and the corresponding opening 14 should be strong and tight enough so that accidental opening of flaps 20 is prevented while intentional opening of flaps 18 by an adult is obtainable. Pressure on any other location on the flaps 20 will not cause the flaps 20 to open. Therefore, accidental opening of flaps 20 is further minimized.

Figure 6:
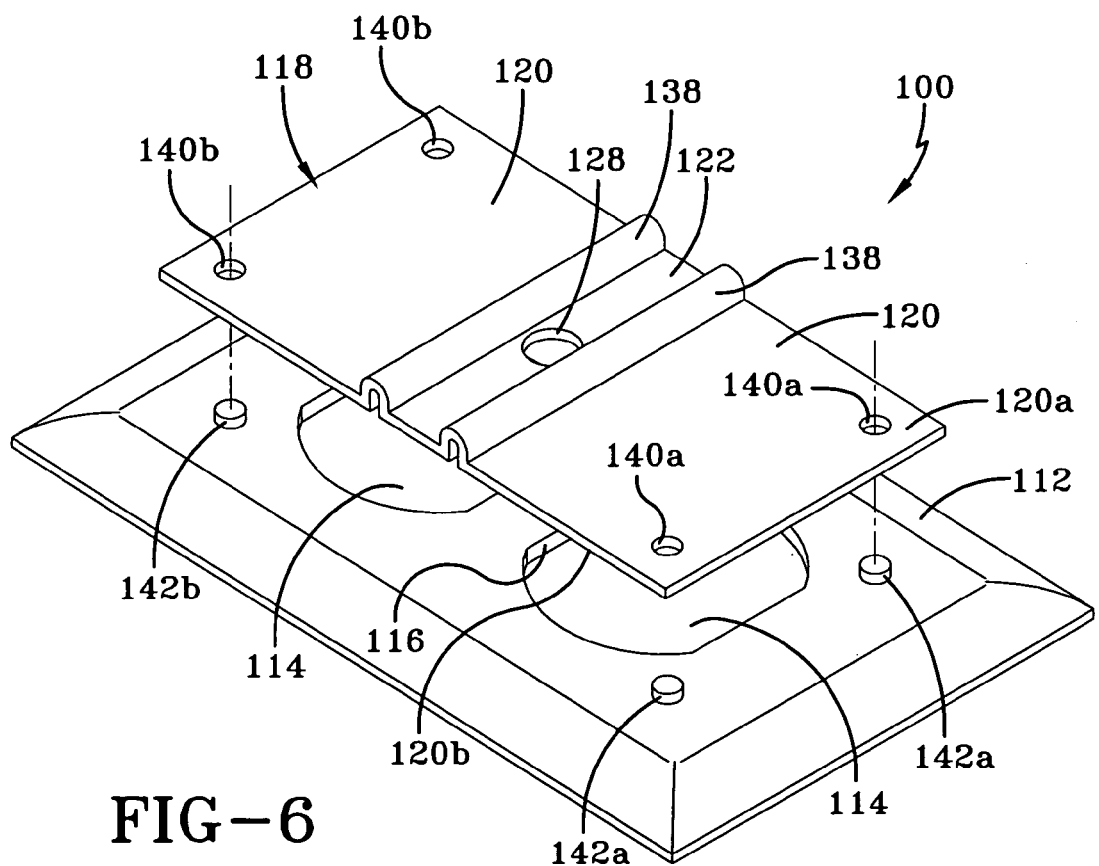
FIG. 6 is an exploded perspective view of a second embodiment of the wall outlet plate assembly according to the present invention.
Figure 7:
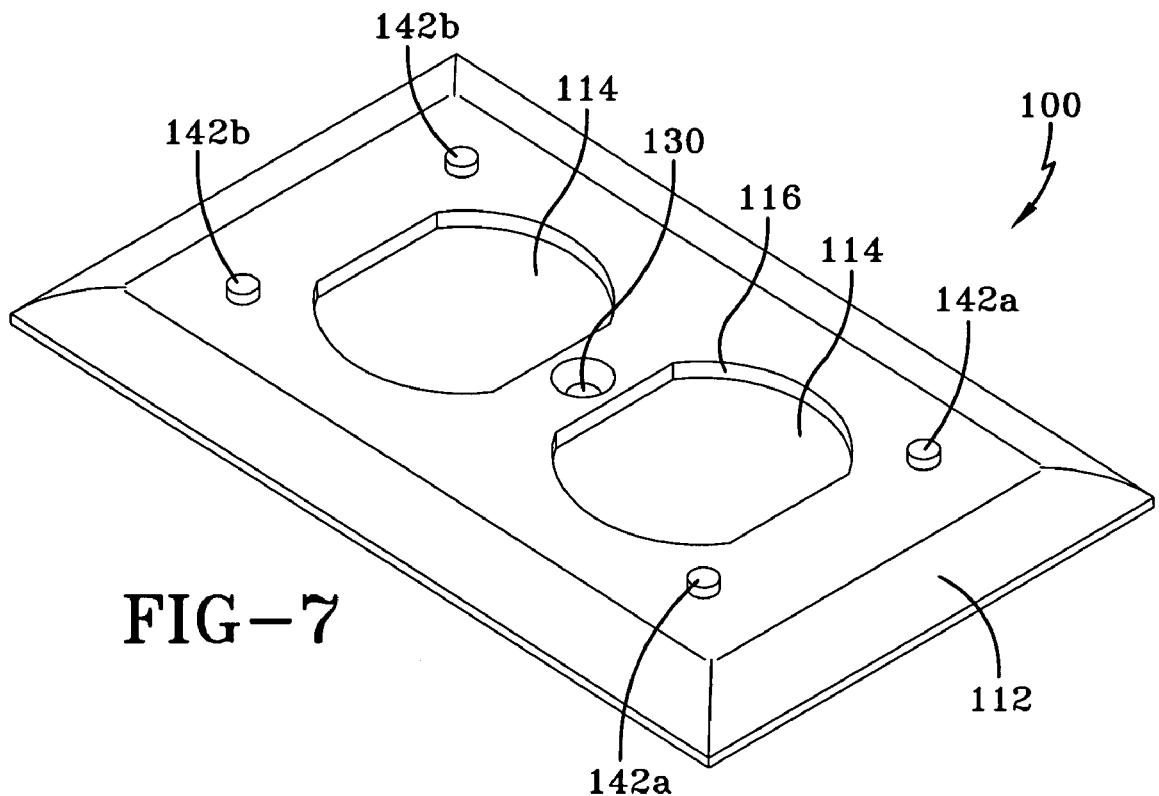
FIG. 7 is a top perspective view of a partial wall outlet plate assembly according to the present invention as shown in FIG. 6.
Figure 8:
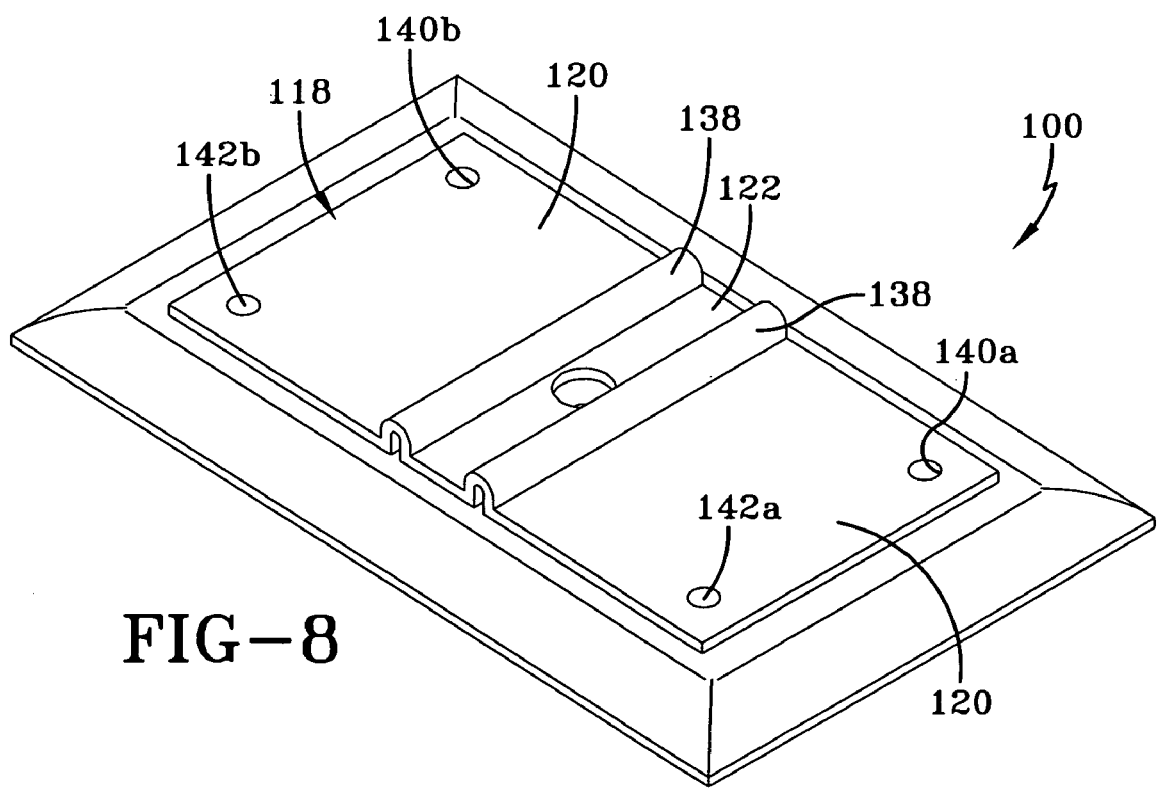
FIG. 8 is another perspective top view of the wall outlet plate assembly according to the present invention as shown in FIG. 6.

Turning now to FIGS. 6-8, an alternative embodiment of the present invention is discussed and shown generally at numeral 100. In this alternative embodiment, the wall outlet plate assembly 100 is substantially the same as that in the aforementioned embodiment. Outlet plate assembly 100 comprises a wall outlet plate 112 comprising a rectangular-shaped body having two openings 114 which correspond to the underlying electrical outlet (not shown) over which outlet plate assembly 100 covers. It should also be appreciated that the outlet plate assembly 100 of this embodiment of the present invention may include any number of openings and may include a body having any conventional shape; however, for ease of discussion, the present invention will be shown and described as having a rectangular-shaped body having two openings 114. Each opening 114 is defined by an outer rim 116. Plate 112 further includes at least one protrusion, peg or notch 142a and/or 142b, discussed further below. In this instance, two pairs of opposing notches 142a, 142b are provided on plate 112.

As shown in FIGS. 6 and 8, outlet plate assembly 100 includes a closure assembly 118 having a central spine 122 and two opposing flaps or covers 120 which extend outwardly from spine 122 and are pivotable or movable relative to spine 122 by way of a corresponding flexible joint 138 providing a moveable or pivotable connection between each spine 122 and each respective flap 120. In this embodiment, each flap 120 comprises a top surface 120a, a bottom surface 120b and a substantially rectangular body. Each flap 120 further includes at least one hole 140a and/or 140b for corresponding to and engaging with a corresponding notch 142a and/or 142b on outlet plate 112. It should be appreciated that any number of holes 140a and/or 140b may be provided on flaps 120 and any number of notches 142a and/or 142b may be provided on plate 112; however, it is preferred that each hole 140a and/or 140b is provided on flap 120 for corresponding to a notch 142a and/or 142b on outlet plate 112 and that the same number of notches 142a and/or 142b and holes 140a and/or 140b are provided on assembly 100. As shown in FIGS. 6 and 8, two pairs of opposing holes 140a, 140b are provided on flaps 120 for corresponding to and engaging with notches 142a, 142b on plate 112. As shown in FIG. 8, holes 140a, 140b engage with notches 142a, 142b for securing flap assembly 120 in place on outlet plate 112. It should be appreciated that flaps 120a and/or 120b in this embodiment may also comprise any conventional shape, so long as holes 140a and/or 140b correspond to and are engageable with notches 142. It should also be appreciated that flaps may comprise the notches while the flaps comprise the corresponding holes, or even any combination thereof.

Closure assembly 118 further includes a threaded hole 128 at the center of spine 122 which corresponds to a threaded hole 130 (FIG. 7) of outlet plate 112. Holes 128, 130 are aligned for receiving a securing device (not shown), such as a threaded screw, for securing closure assembly 118 to outlet plate 112 and in turn to the wall outlet in the same manner as that described in relation to the first embodiment of the present invention. It should be appreciated that outlet plate 112 and closure assembly 118 may also be formed as an integral unit by any conventional thermoplastic injection molding process known in the art.

As shown in FIGS. 6 and 8, flaps 120 extend outwardly from spine 122 such that flaps 120 correspond to openings 114. In other words, while in a closed position, each flap 120 corresponds with and fully covers the respective corresponding opening 114 so that each flap 120 securely covers the corresponding opening 114 and substantially restricts access to the corresponding opening 114 while also preventing undesirable drafts through openings 114. In the same manner as the first embodiment, when engaged, it should be appreciated that the undersurface of each flap 120 which engages the face of plate 112 is flush therewith.

It should also be appreciated that the assembly 100 further comprises a layer of insulation material (not shown) in the same manner as that described in assembly 10. The insulation material is applied on the backside of plate 112 and serves as an additional preventative measure against the transmission of unwanted drafts in and through the outlet assembly. It should again be appreciated that the insulation material comprises the same general configuration and dimensions as outlet plate 112 and is of a dimension and configuration such that the backside of outlet plate 112 is fully covered by the insulation material.

Figure 9:
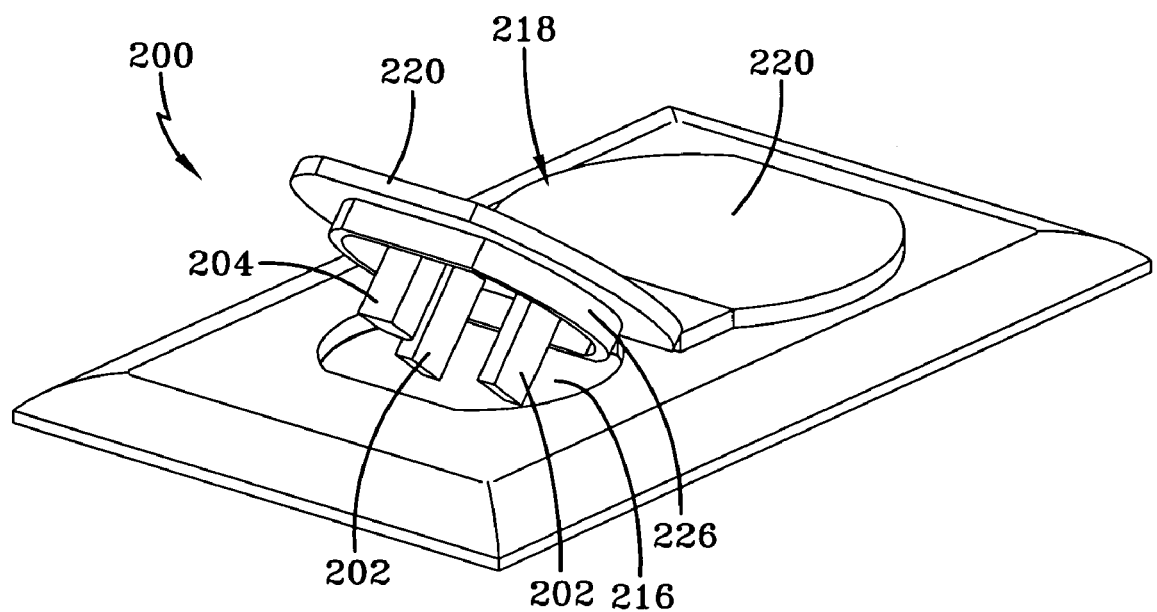
FIG. 9 is a perspective view of an additional alternative embodiment of the wall outlet plate assembly of the present invention.

Turning now to FIG. 9, another alternative embodiment of the present invention is shown at numeral 200. Assembly 200 is essentially identical in the embodiment shown at FIG. 9 as that shown in FIGS. 1-5, including a closure assembly 218 comprising a pair of flaps 220 each having a ridge 226 on the bottom surface of each flap 220 and a wall plate 203 having at least one access opening 216 for providing access to the wall outlet. However, assembly closure assembly 218 in this embodiment further includes a pair of prongs 202 integrally formed with flaps 220. In addition, assembly 200 in this embodiment may have ridge 226 omitted. Prongs 202 extend outwardly from the bottom surface of each flap 220 for insertion into a corresponding electrical outlet (not shown). An optional third prong 204 may also be included for specific use with three-prong electrical outlets. However, it should be appreciated that the embodiment of the present invention having two prongs 202 would be employable with both two-prong electrical outlets as well as with three-prong electrical outlets.

Assembly 200 as shown in FIG. 9 comprises prongs 202 having a standard length or having a length somewhat shorter than the length of the prongs of a standard wall plug for facilitating the opening and closing of flaps 220 as well as for facilitating the ability for prongs 202 to remain in place in the wall outlet while in use. In other words, prongs 202 may have a length somewhat shorter than standard prongs since a standard length may restrict the ability of flaps 220 to freely open and close since prongs 202 having a standard length may be blocked by the edge of opening 216 as flaps 220 are opened or closed. On the other hand, prongs 202 having too short of a length may not be able to sufficiently engage with the wall outlet thereby preventing sufficient closure. A conventional plug has prongs of about ⅔ inch in length. Prongs 202 as shown in FIG. 9 have a length of between ⅖ inch and ⅔ inch, more advantageously ½ inch in length.

TEST RESULTS

An "Infiltrometer House Leakage Test Report" (or a Blower Door Test) was performed for testing the present invention in a standard apartment having fourteen (14) air exchanges per day. A blower door is a large fan that is mounted into an outside door frame that measures the air leaks (drafts) of the house. The blower door helps find the air leaks by depressurizing the house (i.e., blowing indoor air outside). The blower door is attached to sensors inside and outside the house for collecting data, as well as to a computer for storing and analyzing the collected data. The computer program creates a report that measures how many air exchanges the home has per day, based on information received from the sensors.

The typical number of air exchanges for a standard apartment (or a home) is 9.7 per day, that being the recommended national ventilation standard. In order to obtain the required fresh air on a yearly average basis, the home needs 0.8 ft$^2$ of air leaks. These leaks typically should allow clean, fresh outside air to enter the home, such as around windows and doors, and not potentially dirty or polluted air from attics, garages, crawlspaces, basements or underground.

The same apartment was subsequently tested after placement of the present invention in all the wall outlets throughout the apartment. The Infiltrometer House Leakage Test subsequently measured 1.0 ft$^2$ of total leakage area in the apartment. The calculated optimum leakage area would be 0.78 ft$^2$, 111.7 in$^2$. The test measured 0.97 ft$^2$ or 139.0 in$^2$. This measurement translates to 12.03 air exchanges per day, which is a 25% reduction in air exchange per day.

The present invention has been described with particular reference to the preferred embodiments thereof, but it should be understood that variations and modifications within the spirit and scope of the invention may occur to those skilled in the art to which the invention pertains.

I claim:

1. A wall outlet plate assembly for use with an electrical outlet, said assembly comprising:
    an outlet plate comprising at least one outer rim defining at least one access opening for providing access to an electrical outlet;
    a closure assembly securable to said outlet plate, said closure assembly comprising at least one moveable flap, wherein said at least one moveable flap corresponds to said at least one access opening, said closure assembly comprising a central spine having at least one joint for connecting said central spine to said at least one flap, said at least one flap being moveable relative to said central spine at said at least one joint, and wherein said at least one moveable flap comprises a top side, a bottom side and an underlying ridge integral with said bottom side, said ridge comprising a configuration corresponding to the configuration of said at least one rim defining said at least one access opening and being engageable with said at least one rim in a snap-fit engagement so said at least one flap securely covers said at least one access opening and substantially restricts access through said at least one access opening to the electrical outlet; and
    an insulating layer securable to the underside of said outlet plate, said insulating layer comprising at least one outer edge for defining at least one access opening, said access opening providing access to an electrical outlet.

2. The wall outlet plate assembly according to claim 1, further comprising a pivot area between said outlet plate and said central spine at the center of said central spine, wherein said pivot area translates manually applied pressure to said central spine to effect a reactive force to cause said at least one flap connected to said at least one joint of said at least one flap to move away from said outlet plate about said at least one joint and from said at least one access opening.

3. The wall outlet plate assembly according to claim 2, wherein said pivot area is selected from the group consisting of a removable nut, a removable washer and an integral raised portion.

4. The wall outlet plate assembly according to claim 1, wherein said insulating material is a thermal insulating material having a low thermal conductivity and good compressibility and resilience, said insulating material being selected from the group consisting of fiberglass, mineral wool, plastic fiber, polyethylene terephthalate, rubber, foams, and closed natural fibers.

5. The wall outlet plate assembly according to claim 4, wherein said foams are selected from the group consisting of polyurethane foams, urea-formaldehyde foam, nitrogen-based urea-formaldehyde foam, phenolic foam, and cementitious foam, and wherein said natural fibers are selected from the group consisting of cotton, wool, hemp and straw.

6. The wall outlet plate assembly according to claim 4, wherein said insulating material has a thickness in the range of between $1/8^{th}$ inch and 1/4 inch.

7. The wall outlet plate assembly according to claim 1, wherein said outlet plate and said closure assembly are an integral unit.

8. The wall outlet plate assembly according to claim 1, wherein said insulating layer is permanently fixed to the underside of said outlet plate by glue.

9. The wall outlet plate assembly according to claim 1, wherein said outlet plate comprises two outer rims defining two access openings, said closure assembly comprises two flaps for corresponding to said two access openings and said insulation layer comprises two outer edges defining two access openings for corresponding to said two access openings of said outlet plate.

10. A wall outlet plate assembly for use with an electrical outlet, said assembly comprising:
   an outlet plate comprising at least one outer rim defining at least one access opening for providing access to an electrical outlet;
   a closure assembly securable to said outlet plate, said closure assembly comprising at least one moveable flap, wherein said at least one moveable flap corresponds to said at least one access opening, said closure assembly comprising a central spine having at least one joint for connecting said central spine to said at least one flap, said at least one flap being moveable relative to said central spine at said at least one joint, and wherein said at least one moveable flap comprises a top side, a bottom side and an underlying ridge integral with said bottom side, said ridge comprising a configuration corresponding to the configuration of said at least one rim defining said at least one access opening and being engageable with said at least one rim in a snap-fit engagement so said at least one flap securely covers said at least one access opening and substantially restricts access through said at least one access opening to the electrical outlet;
   an insulating layer securable to the underside of said outlet plate, said insulating layer comprising at least one outer edge for defining at least one access opening, said access opening providing access to an electrical outlet; and
   at least one nodule on the outer periphery of said ridge, wherein said at least one nodule is integral with said ridge and extends outwardly from said ridge.

11. A wall outlet plate assembly for use with an electrical outlet, said assembly comprising:
   an outlet plate comprising at least one outer rim defining at least one access opening for providing access to an electrical outlet;
   a closure assembly securable to said outlet plate, said closure assembly comprising at least one moveable flap, wherein said at least one moveable flap corresponds to said at least one access opening, said closure assembly comprising a central spine having at least one joint for connecting said central spine to said at least one flap, said at least one flap being moveable relative to said central spine at said at least one joint, and wherein said at least one moveable flap comprises a top side, a bottom side and an underlying ridge integral with said bottom side, said ridge comprising a configuration corresponding to the configuration of said at least one rim defining said at least one access opening and being engageable with said at least one rim in a snap-fit engagement so said at least one flap securely covers said at least one access opening and substantially restricts access through said at least one access opening to the electrical outlet;
   an insulating layer securable to the underside of said outlet plate, said insulating layer comprising at least one outer edge for defining at least one access opening, said access opening providing access to an electrical outlet; and
   at least one nodule on the outer periphery of said rim, wherein said at least one nodule is integral with said rim and extends outwardly from said rim.

12. A wall outlet plate assembly for use with an electrical outlet, said assembly comprising:
   an outlet plate comprising at least one outer edge defining at least one access opening for providing access to an electrical outlet;
   a closure assembly securable to said outlet plate, said closure assembly comprising at least one moveable flap, wherein said at least one moveable flap has a configuration corresponding to said at least one access opening, said closure assembly comprising a central spine having at least one joint for connecting said central spine to said at least one flap, said at least one flap being moveable relative to said central spine at said at least one joint between open and closed conditions, and wherein said at least one moveable flap comprises a top side and a bottom side;
   a securing assembly for securing said at least one flap of said closure assembly to said outlet plate for covering an electrical outlet, said securing assembly comprising at least one notch in one of said outlet plate and said closure assembly, and at least one matching hole in the other of said outlet plate and said closure assembly, said at least one matching hole receiving said at least one notch when said at least one flap is in the closed position; and
   an insulating layer securable to the underside of said outlet plate, said insulating layer comprising at least one outer edge for defining at least one access opening, said access opening providing access to an electrical outlet.

13. The wall outlet plate assembly according to claim 12, wherein said insulating material is a thermal insulating material having a low thermal conductivity and good compressibility and resilience, said insulating material being selected from the group consisting of fiberglass, mineral wool, plastic fiber, polyethylene terephthalate, rubber, foams, and closed natural fibers.

14. The wall outlet plate assembly according to claim 13, wherein said foams are selected from the group consisting of polyurethane foams, urea-formaldehyde foam, nitrogen-based urea-formaldehyde foam, phenolic foam, and cementitious foam, and wherein said natural fibers are selected from the group consisting of cotton, wool, hemp and straw.

15. The wall outlet plate assembly according to claim 13, wherein said insulating material has a thickness in the range of between $1/8^{th}$ inch and 1/4 inch.

16. The wall outlet plate assembly according to claim 12, wherein said outlet plate and said closure assembly are an integral unit.

17. The wall outlet plate assembly according to claim 12, wherein said insulating layer is permanently fixed to the underside of said outlet plate by glue.

18. The wall outlet plate assembly according to claim 12, wherein said outlet plate comprises two outer edges defining two access openings, said closure assembly comprises two flaps for corresponding to said two access openings and said insulation layer comprises two outer edges defining two access openings for corresponding to said two access openings of said outlet plate.

19. A wall outlet plate assembly for use with an electrical outlet, said assembly comprising:
an outlet plate comprising at least one outer rim defining at least one access opening for providing access to an electrical outlet;
a closure assembly securable to said outlet plate, said closure assembly comprising at least one moveable flap, wherein said at least one moveable flap has a configuration corresponding to said at least one access opening, said closure assembly comprising a central spine having at least one joint for connecting said central spine to said at least one flap, said at least one flap being moveable relative to said central spine at said at least one joint between open and closed positions, and wherein said at least one moveable flap comprises a top side, a bottom side, an underlying ridge integral with said bottom side and at least one prong extending outwardly from the bottom side of said at least one flap, said ridge comprising a configuration corresponding to the configuration of said at least one rim defining said at least one access opening and being engageable with said at least one rim in a snap-fit engagement so said at least one flap securely covers said at least one access opening and substantially restricts access through said at least one access opening to the electrical outlet, said at least one prong being insertable into a receptacle of the electrical outlet; and
an insulating layer securable to the underside of said outlet plate, said insulating layer comprising at least one outer edge for defining at least one access opening, said at least one access opening providing access to an electrical outlet.

20. The wall outlet plate assembly according to claim 19, further comprising a pivot area between said outlet plate and said central spine at the center of said central spine, wherein said pivot area translates manually applied pressure to said central spine to effect a reactive force to cause said at least one flap connected to said at least one joint of said at least one flap to move away from said outlet plate about said at least one joint and from said at least one access opening.

21. The wall outlet plate assembly according to claim 20, wherein said pivot area is selected from the group consisting of a removable nut, a removable washer and an integral portion.

22. The wall outlet plate assembly according to claim 19, wherein said insulating material is a thermal insulating material having a low thermal conductivity and good compressibility and resilience, said insulating material being selected from the group consisting of fiberglass, mineral wool, plastic fiber, polyethylene terephthalate, rubber, foams, and closed natural fibers.

23. The wall outlet plate assembly according to claim 22, wherein said foams are selected from the group consisting of polyurethane foams, urea-formaldehyde foam, nitrogen-based urea-formaldehyde foam, phenolic foam, and cementitious foam, and wherein said natural fibers are selected from the group consisting of cotton, wool, hemp and straw.

24. The wall outlet plate assembly according to claim 19, wherein said outlet plate and said closure assembly are an integral unit.

25. A wall outlet plate assembly for use with an electrical outlet, said assembly comprising:
an outlet plate comprising two opposing outer edges having respective configurations defining two opposing access openings for providing access to an electrical outlet, and a central opening disposed between said access openings;
a closure assembly securable to said outlet plate, said closure assembly comprising:
two opposing moveable flaps and a central opening corresponding to said central opening of said outlet plate, wherein said moveable flaps correspond in size and configuration to said access openings, wherein said flaps are flush with the top surface of said outlet plate when said flaps are in a closed position;
a central spine having two opposing flexible parallel joints for connecting said central spine to said flaps, said flaps being pivotable relative to said central spine on said opposing joints, and wherein said each flap of said two flaps comprise a top side, a bottom side and an underlying ridge integral with said bottom side, said ridge comprising a configuration corresponding to the configuration of said edges defining said openings and being engageable with said edge, and wherein said ridges of said flaps firmly engage with said outlet plate access openings when said flaps are in a closed position;
an insulating layer securable to the underside of said outlet plate, said insulating layer comprising two outer edges for defining two insulating layer access openings and a central opening disposed between said access openings corresponding to said central opening of said outlet plate and said central opening of said closure assembly, said insulating layer access openings providing access to an electrical outlet and corresponding to said two access openings of said outlet plate, wherein said insulating material is a thermal insulating material having a low thermal conductivity and good compressibility and resilience, said insulating material being selected from the group consisting of fiberglass, mineral wool, plastic fiber, polyethylene terephthalate, rubber, foams, and closed natural fibers, wherein said insulating material has a thickness in the range of between $1/8^{th}$ inch and $1/4$ inch and wherein said insulating layer is permanently fixed to the underside of said outlet plate by glue; and
a pivot area between said outlet plate and said central spine at the center of said central spine, wherein said pivot area translates manually applied pressure to said central spine to effect a reactive force to cause said flaps connected to said joints of said flaps to move away from said outlet plate about said joints and from said access opening, wherein said pivot area is a removable nut and a removable washer combination,
wherein said central opening of said outlet plate, said central opening of said closure assembly and said central opening of said insulating material are in alignment to accommodate a fastener for securing said outlet plate, said closure assembly and said insulating material together and to an electrical outlet.

26. The wall outlet plate assembly according to claim 25, wherein said foams are selected from the group consisting of polyurethane foams, urea-formaldehyde foam, nitrogen-based urea-formaldehyde foam, phenolic foam, and cementitious foam, and wherein said natural fibers are selected from the group consisting of cotton, wool, hemp and straw.

27. The wall outlet plate assembly according to claim 25, further comprising a nodule on the outer periphery of said ridge, wherein said nodule is integral with said ridge and extends outwardly from said ridge.

28. A seal cap assembly for use with a wall outlet plate having at least one outer edge defining at least one access opening for providing access to an electrical outlet, said seal cap assembly comprising:
  at least one moveable seal cap, wherein said at least one moveable seal cap corresponds to the at least one access opening of the wall outlet;
  a central spine having at least one joint for connecting said central spine to said at least one seal cap, said at least one seal cap being moveable relative to said central spine at said at least one joint, wherein said at least one moveable seal cap comprises a top side and a bottom side;
  an underlying ridge integral with said bottom side of said at least one seal cap, said ridge comprising a configuration corresponding to the configuration of the at least one edge defining the at least one access opening of the wall outlet and being engageable with the at least one edge; and
  a central opening on said central spine disposed between said seal caps for accommodating a threaded screw fastener for securing said seal cap assembly to an electrical outlet plate
  at least one supplemental structure on the outer periphery of said ridge, wherein said at least one supplemental structure is integral with said ridge and extends outwardly from said ridge.

29. The seal cap assembly according to claim 28, wherein said at least one supplemental structure is at least one nodule.

* * * * *